United States Patent
Calvin

(10) Patent No.: US 6,244,744 B1
(45) Date of Patent: Jun. 12, 2001

(54) THREE-WIRE RTD INTERFACE

(76) Inventor: James Calvin, 10 Twin Oak, Mansfield, MA (US) 02048

(*) Notice: Subject to any disclaimer, the term of this patent is extended or adjusted under 35 U.S.C. 154(b) by 0 days.

(21) Appl. No.: 09/314,817

(22) Filed: May 19, 1999

Related U.S. Application Data

(60) Provisional application No. 60/086,086, filed on May 20, 1998.

(51) Int. Cl.$^7$ ................................. G01K 7/00; H01L 7/13
(52) U.S. Cl. ............................... 374/183; 374/173; 338/25
(58) Field of Search .................... 374/183, 185; 338/25

(56) References Cited

U.S. PATENT DOCUMENTS

| | | | |
|---|---|---|---|
| 3,913,403 | * 10/1975 | Arcara | 374/183 |
| 4,102,199 | * 7/1978 | Tsipouras | 73/362 AR |
| 4,209,774 | 6/1980 | Bendler | 340/347 CC |
| 4,210,024 | * 7/1980 | Ishiwatari et al. | 374/183 |
| 4,294,116 | 10/1981 | Yamamura et al. | 73/362 AR |
| 4,309,653 | * 1/1982 | Stack et al. | 323/369 |
| 4,413,917 | * 11/1983 | Cooper | 374/183 |
| 4,516,865 | 5/1985 | Hideo | 374/172 |
| 4,528,637 | 7/1985 | Smith | 364/557 |
| 4,532,601 | * 7/1985 | Lenderking et al. | 364/571 |
| 4,575,806 | 3/1986 | Aldrich et al. | 364/557 |
| 5,282,685 | 2/1994 | Koegler | 374/172 |
| 5,317,520 | * 5/1994 | Castle | 364/482 |
| 5,481,199 | 1/1996 | Anderson et al. | 324/705 |
| 5,519,644 | 5/1996 | Benton | 364/571.01 |
| 5,719,378 | 2/1998 | Jackson, Jr. et al. | 219/497 |
| 6,053,050 | * 4/2000 | Zahrzah et al. | 73/769 |

FOREIGN PATENT DOCUMENTS

| | | |
|---|---|---|
| 2447629 | 4/1976 | (DE). |
| 24 47 629 | 4/1976 | (DE). |
| 3634052 | 4/1988 | (DE). |
| 36 34 052 | 4/1988 | (DE). |
| 297 05 598 U | 3/1997 | (DE). |
| 297 08 372 U | 5/1997 | (DE). |
| 297 08 372 U | 7/1997 | (DE). |
| 62-012873 | 1/1987 | (JP). |
| 02198326 | 8/1990 | (JP). |
| 02198327 | 8/1990 | (JP). |

* cited by examiner

*Primary Examiner*—G. Bradley Bennett
*Assistant Examiner*—Gail Verbitsky
(74) *Attorney, Agent, or Firm*—Foley, Hoag & Eliot LLP; W. Hugo Liepmann; Kevin A. Oliver

(57) ABSTRACT

In a three-wire RTD interface, a known current is connected to a first lead during a first measurement interval. In this configuration, current is directed to the first lead and into an RTD. This results in a first signal indicative of a first voltage drop resulting from the voltage drops across the RTD and the lead resistance of the first lead. During a second measurement interval, current is directed through a second lead having a lead resistance substantially identical to the lead resistance of the first lead. This results in a second signal indicative of the voltage drop resulting from the second lead. The first signal, the second signal, and the known current are then combined to eliminate the effect of the lead resistance and to determine the resistance of the RTD.

17 Claims, 3 Drawing Sheets

THREE-WIRE RTD INTERFACE

This invention relates to resistance temperature detectors (RTDs), and in particular, to methods and apparatus for reducing measurement errors caused by lead resistance in wires extending from an RTD to a voltage measurement site. This application claims priority from U.S. provisional application No. 60/086,086, filed May. 20, 1998 which is incorporated herein by this reference.

BACKGROUND

In 1821, the English chemist Sir Humphrey Davy discovered that all metals have a positive temperature coefficient of resistance. This discovery led to the development of the resistance temperature detector (RTD), which today is a widely used device for the measurement of temperature in industrial processes.

The quantum mechanical explanation for this effect is that the metal nuclei vibrate with an amplitude that depends on the temperature of the metal. These nuclear vibrations generate phonons within the metal, the energy of which depend on the amplitude of the nuclear vibrations. When electrons flow through the metal, they tend to be scattered by these phonons. This interaction, which disrupts the smooth flow of electrons through the metal, is what we measure as resistivity. As the temperature of the metal increases, the nuclear vibrations increase in amplitude and generate higher energy phonons. These higher-energy phonons scatter electrons more effectively, thereby increasing the resistivity of the metal.

An RTD is typically made by wrapping a length of metal wire around a ceramic bobbin, or by depositing a thin film of metal on a substrate. Generally, a metal having high resistivity is used, so as to minimize the amount of metal required. Because of its resistance to contamination and its stable and predictable temperature coefficient, a commonly used metal is platinum.

To measure temperature with an RTD, one exposes the RTD at the site whose temperature is of interest and allows the RTD to reach thermal equilibrium. One then passes a known current through the RTD. Preferably, this current is relatively small to minimize measurement error arising from ohmic heating of the metal in the RTD. One then measures the voltage across the RTD. From the known current and the measured voltage, one can calculate a resistance whose value is indicative of temperature.

In practice, the RTD is often physically inaccessible. For example, the RTD might be placed deep in a caustic chemical bath, remote from the measurement instrumentation. As a result, extended wire leads are generally required to connect the RTD to a voltmeter. In such cases, the resistance measured by the voltmeter is the sum of the RTD resistance and the lead resistance associated with the extended wire leads. This lead resistance introduces error in the measurement.

To the extent that the lead resistance is much smaller than the RTD resistance, the fact that the RTD resistance measurement is corrupted by the lead resistance results in only a small error. However, in most RTDs, even a small change in the RTD resistance translates to a significant change in temperature. For example, in the case of a platinum RTD, the resistance is 100 ohms at 0 degrees C. and changes by 0.00385 ohms per ohm degree C. Hence, a 100-ohm RTD changes its resistance by only 0.385 ohms per degree of change in temperature. Thus, a lead resistance as small as two ohms results in a five degree C. measurement error.

Given that the leads to the RTD in many industrial applications can be as much as half a mile long, it is easy to see how the lead resistance can significantly reduce the accuracy of the temperature measurement.

To avoid this difficulty, it is known to provide a first pair of leads extending from the current source to the RTD and a second pair of leads extending from the RTD to the voltmeter. In this configuration, referred to as the four-wire RTD interface, the lead resistance between the voltmeter and the RTD does not introduce an error because there is no current in those leads. Although the four-wire RTD interface eliminates the effect of lead resistance, it does so at the cost of doubling the length of wire required.

Another known method of eliminating the effect of lead resistance is the three-wire RTD interface. This interface uses a first current source connected to a first terminal of the RTD by a first lead and a second, identical current source connected to the second terminal of the RTD by a second lead. A third lead connected to the second terminal of the RTD provides a return path for the current provided by both current sources. In the three-wire RTD interface, one can subtract the voltage measured at the second lead from the voltage measured at the first lead to obtain the voltage across the RTD. However, the accuracy of the three-wire RTD interface relies heavily on the two current sources being identical. As a practical matter, it is difficult to provide two current sources that perform identically.

It is thus an object of the invention to provide an interface for measurement of temperature with an RTD that eliminates the effect of lead resistance without using excessive lengths of wire and without relying on two identical current sources for accurate temperature measurement.

SUMMARY

In the RTD interface of the invention, a single current source generates two different measurements at two different times over across two different pairs of leads. These two different measurements are combined to eliminate the effect of lead resistance in the wire leads connecting the RTD and the interface.

The RTD interface of the invention is attached by three leads to an RTD having first and second terminals. The first lead connects to the first terminal; the second and third leads connect to the second terminal. The RTD interface includes a current source connected to a switch having a first position and a second position. In the first position, current from the current source is directed to the first lead and diverted from the second lead. Conversely, in the second position, current from the current source is directed to the second lead and away from the first lead. In response to a signal from a processor, a switch controller selectively sets this switch to the first position during a first measurement interval and to the second position during a second measurement interval.

The first and second leads are also connected to the terminals of a voltage measuring element which evaluates a first voltage difference between the leads during the first measurement interval and a second voltage difference between the leads during the second measurement interval. The voltage measuring element includes an output terminal carrying a signal indicative of the voltage difference between the first and the second lead. This output terminal is connected to the input of a processor which processes the first and second voltage differences to obtain the RTD voltage.

The switch can be a relay switch or a solid-state switch, however any switch that can direct the current from the current source in the manner described above can be successfully employed in the invention.

The switch controller is typically a microprocessor. Use of a microprocessor is advantageous because the same microprocessor can be used to process the output of the voltage measuring element. However, the switch can also be controlled manually or by a clocking circuit.

The voltage measuring element can be a differential amplifier having a first input connected to the first lead and a second input connected to the second lead. When a microprocessor is used to process the output of the voltage measuring element, it is advantageous to provide an analog-to-digital converter between the output of the differential amplifier and the input to the microprocessor.

The processor is typically a microprocessor. However, any circuit that can evaluate the sum of two voltage differences taken during different measurement intervals can be used to process the output of the voltage measurement element to remove the effect of the lead resistance. When used in the context of a feedback control system, particularly one in which temperature is a controlled variable, it is convenient to use the microprocessor associated with the controller.

The invention also includes a method of determining the voltage across an RTD by taking two measurements during two different measurement intervals. During the first measurement interval, a known current is directed through a first lead connected to the first terminal of the RTD and through the RTD itself. This first step results in the generation of a first signal indicative of a first voltage drop. During the second measurement interval, the known current is directed through a second lead connected to a second terminal of the RTD. During this second measurement interval, no appreciable current flows through the RTD. This second step results in the generation of a second signal indicative of a second voltage drop. The first and second signals are then combined to eliminate the effect of any lead resistance and to obtain the resistance of the RTD alone.

These and other features of the invention will be further apparent in connection with the following detailed description and the accompanying figures, in which:

DETAILED DESCRIPTION

Figure 1:
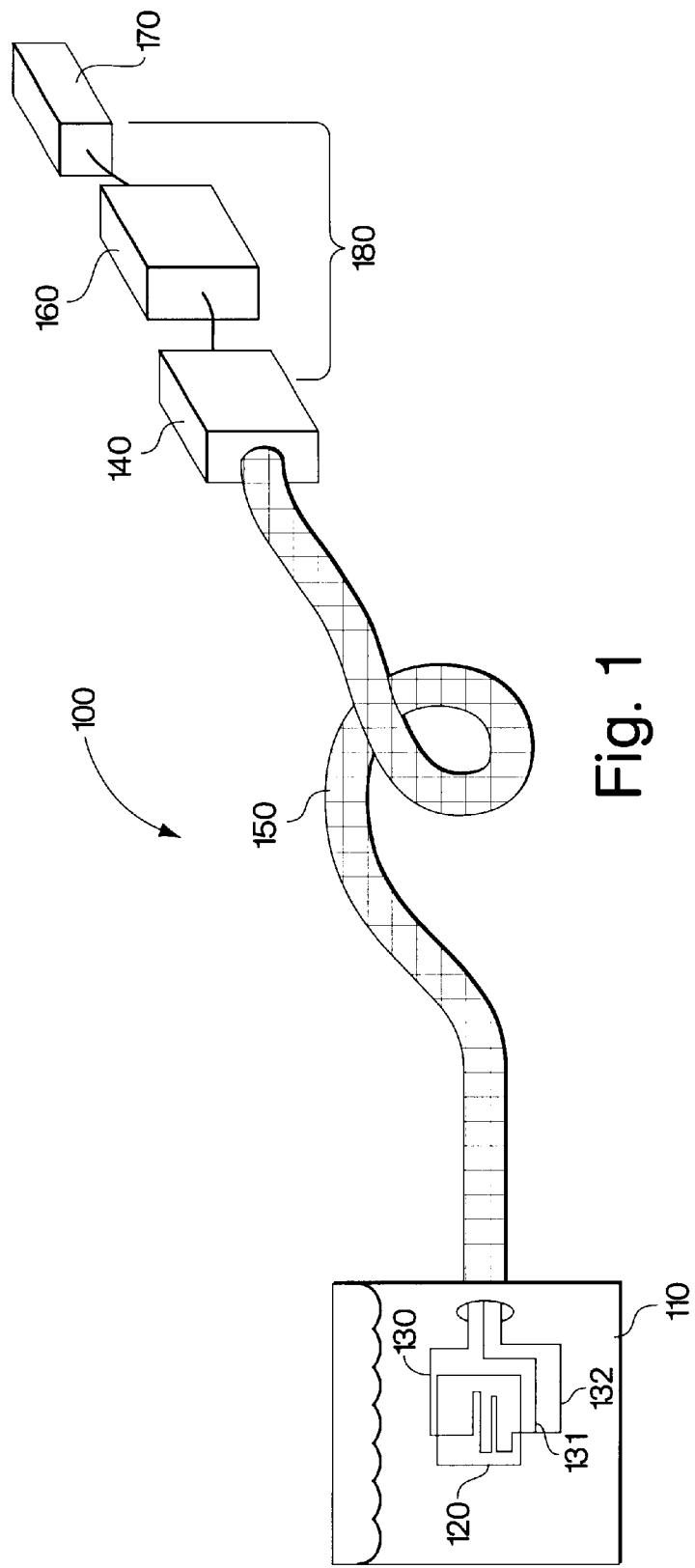
FIG. 1 shows a temperature measurement system incorporating an RTD interface according to the invention.

Referring to FIG. 1, a temperature measurement system 100 incorporating a three-wire RTD interface according to the invention includes a containment vessel 110 containing a substance, generally a liquid or gas, whose temperature is to be measured. A resistance temperature detector (RTD) 120 immersed in the substance is connected, by a first lead 131, a second lead 132, and a third lead 133, to an RTD interface 140. Because the RTD interface 140 can be remote from the containment vessel 110, the three leads 131, 132, 133 can be relatively long. To protect the leads from environmental stresses, the three leads 131, 132, 133 are encased in a protective sheath 150 extending between the containment vessel 110 and the RTD interface 140. The protective sheath 150 can be grounded or provided with electromagnetic shielding in order to prevent stray electrical interference from corrupting the temperature measurement.

The RTD interface 140 includes an output terminal connected to an A/D converter 160, for converting the analog signal generated by the RTD interface 140 into a corresponding digital signal for further processing by a processor 170 in communication with the A/D converter 160. The processor 170 is also connected directly to the RTD interface 140 by a communication path 180 through which it controls a switch within the RTD interface 140 in a manner described below. Although it is advantageous to use the processor 170 as a switch controller, the switch controller need not be the processor 170.

Figure 2:
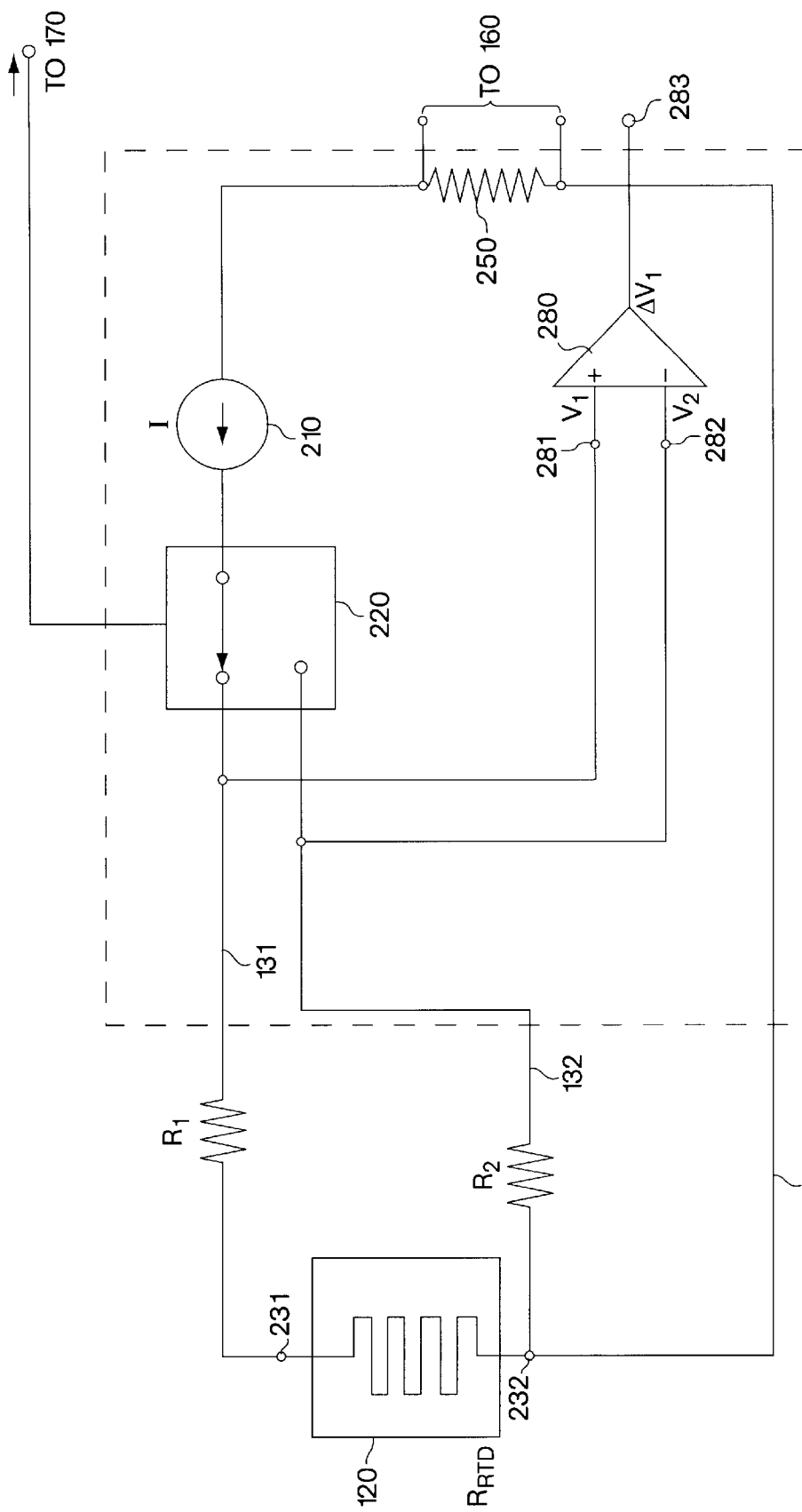
FIG. 2 is a schematic illustration of the interface of FIG. 1 with the switch in the first position.
Figure 3:
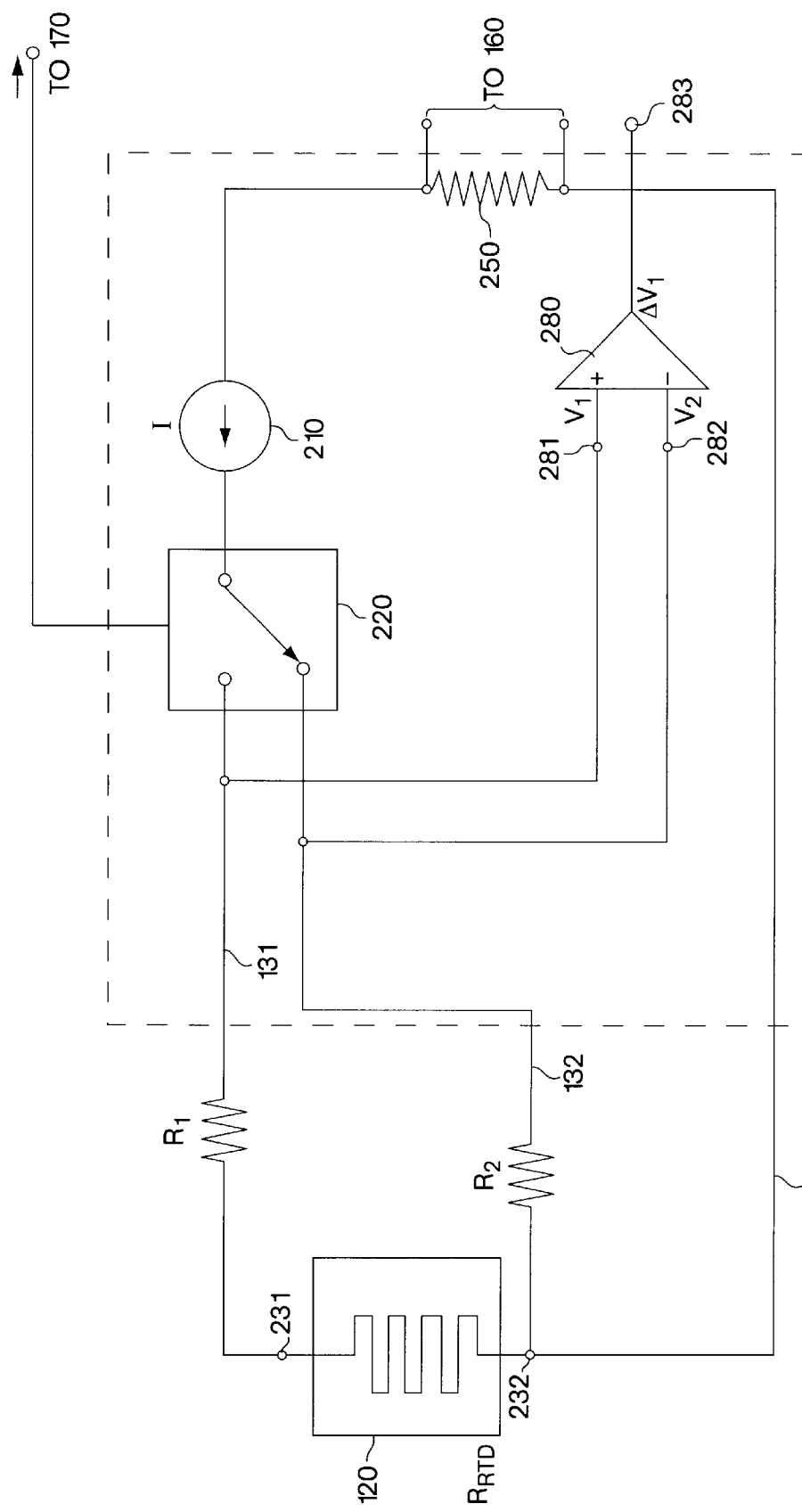
FIG. 3 is a schematic illustration of the interface of FIG. 1 with the switch in the second position.

Referring to FIG. 2, an RTD interface 140 according to the invention includes a current source 210 connected to a switch 220 having a first position and a second position. In the first position, shown in FIG. 2, the switch 220 connects the current source 210 to the first lead 131, which extends to a first terminal 231 of the RTD 120. In the second position, shown in FIG. 3, the switch 220 connects the current source 210 to the second lead 132, which extends to a second terminal 232 of the RTD 120. The processor 170, which is in communication with the switch 220 by way of the communication path 180, is configured to selectively place the switch 220 in either the first position, as shown in FIG. 2, or in the second position, as shown in FIG. 3.

With further reference to FIG. 2, the second terminal 232 of the RTD 120 is also connected to a third lead 133 that forms a return path to the current source 210 by way of a reference resistor 250, the voltage across which is made available to the A/D converter 160. The distributed lead resistances of the first, second, and third leads 131, 132, 133 are represented in FIGS. 2 and 3 as lumped circuit elements having the resistances $R_1$, $R_2$, and $R_3$ respectively.

The first and second leads 131, 132 are connected to first and second high impedance inputs 281, 282 of a differential amplifier 280. The output of the differential amplifier 280 is thus proportional to the difference between the voltage $V_1$ measured at the first lead 131 and the voltage $V_2$ measured at the second lead 132. This output is provided to the A/D converter 160 connected to an output terminal 283 of the differential amplifier 280.

In operation, the processor 170 performs a first measurement by placing the switch 220 in the first position, as shown in FIG. 2. In this position, the switch 220 directs a current I from the current source 210 to the first lead 131. This current passes through the first lead 131 where it causes a voltage drop of $IR_1$, $R_1$ being the resistance of the first lead 131. This lead resistance varies with different spools of wire from different manufacturers and even across different spools of wire made by the same manufacturer. Moreover, the lead resistance also varies with the temperature of the wire, which may be different at different locations on the wire and at different times of day. As a result, it is generally not possible to know, with sufficient accuracy, the resistance of the first lead 131.

Having traversed the first lead 131, the current I passes into the RTD 120 where it causes the voltage drop $IR_{RTD}$ indicative of the temperature being measured. It is this voltage drop that the interface 140 is intended to recover.

Because of the high impedance of the second input 282 to the differential amplifier 280, after traversing the RTD 120, the current returns to the current source 210 by way of the third lead 133 where it causes a voltage drop $IR_3$, $R_3$ being the lead resistance of the third lead 133. With the switch 220 in the first position, the voltage measured at the first input 281 of the differential amplifier 280 as a result of the current I is thus $$V_1 = IR_1 + IR_{RTD} + IR_3 \quad \text{(Eq. 1)}$$

and the voltage measured at the second input 282 of the differential amplifier 280 is $$V_2 = OR_2 + IR_3 \quad \text{(Eq. 2)}$$

The output of the differential amplifier 280 with the switch in the first position is thus the difference $$\Delta V_1 = V_1 - V_2 = IR_1 + IR_{RTD} \quad \text{(Eq. 3)}$$

This output is converted into a digital signal by the A/D converter 160 and stored by the processor 170 for later use.

Clearly, it is not possible to obtain the RTD resistance, and hence the temperature, from this measurement alone, because the resulting voltage difference is corrupted by the presence of a term arising from the lead resistance $R_1$ of the first lead 131. However, a second measurement, this time with the switch 220 in the second position, results in the elimination of this error term in the manner to be described below.

Having performed the first measurement, the processor 170 begins performing the second measurement by placing the switch 220 in the second position, as shown in FIG. 3.

With the switch 220 in the second position, current from the current source 210 traverses the second lead 132 where it causes a voltage drop of $IR_2$, $R_2$ being the lead resistance of the second lead 132. Because of the high impedance of the first input 281 of the differential amplifier 280, the current does not flow into the RTD 120. Instead, the current returns to the current source 210 by way of the third lead 133, where it again causes a voltage drop of $IR_3$. With the switch 220 in this second position, the voltage measured at the first input 281 of the differential amplifier 280 is $$V_1 = OR_1 + OR_{RTD} + IR_3 \quad \text{(Eq. 4)}$$

and the voltage measured at the second input 182 of the differential amplifier 180 is $$V_2 = IR_2 + IR_3 \quad \text{(Eq. 5)}$$

The output of the differential amplifier 180 with the switch 210 in the second position is thus $$\Delta V_2 = V_{1-V2} = -IR_2 \quad \text{(Eq. 6)}$$

This output is converted into a digital signal by the A/D converter 160 and passed to the processor 170 for processing with the output of the differential amplifier 280 with the switch 220 in the first position.

The first and second leads 131, 132, both of which extend between the RTD 120 and the interface 140, are chosen to have the same length and to be made of the same materials. Since the first and second leads 131, 132 are physically proximate and traverse the same path between the interface 140 and the RTD 120, they are likely to have essentially identical temperature distributions along their length. As a result, it is reasonable to assume that the first and second leads 131, 132 have the same lead resistances:

$$R_1 = R_2 \quad \text{(Eq. 7)}$$

The processor 170 then adds $\Delta V_1$, the output of the differential amplifier 280 with the switch 220 in the first position, to $\Delta V_2$, the output of the differential amplifier 280 with the switch in the second position. Because the lead resistance of the first lead 131 is the same as the lead resistance of the second lead 132, the resulting sum contains only the term corresponding to the RTD resistance:

$$\Delta V_1 + \Delta V_2 = IR_{RTD} \quad \text{(Eq. 8)}$$

In contrast to the conventional three-wire RTD interface, the three-wire RTD interface 140 of the invention thus performs two measurements using only a single current source 210 and combines these two measurements to isolate the voltage drop across the RTD from the voltage drops caused by the lead resistances. In this way, the three-wire RTD interface 140 of the invention circumvents the difficulties, encountered in prior art three-wire RTD interfaces, associated with obtaining two identical current sources.

Having described the invention and a preferred embodiment thereof, what I claim as new and secured by Letters Patent is:

1. An apparatus for measurement of temperature of a substance in thermal communication with an RTD, the RTD having first and second terminals for measuring an RTD voltage and being connected to a measurement interface by first and second conducting leads extending from the first and second terminals and having substantially equal lead resistances, the apparatus comprising an electrical current source providing a known current,
   a switch having
      a first position in which the first conducting lead is connected to the electrical current source and the second conducting lead is disconnected from the electrical current source, and
      a second position in which the second conducting lead is connected to the current source and the first conducting lead is disconnected from the current source,
   a switch controller coupled to the switch for selectively setting the switch to the first position during a first measurement interval and setting the switch to the second position during a second measurement interval,
   a voltage measuring element connected to the first conducting lead and the second conducting lead for evaluating, during the first measurement interval, a first voltage difference between the first conducting lead and the second conducting lead and for evaluating, during the second measurement interval, a second voltage difference between the first conducting lead and the second conducting lead, the voltage measuring element having an output terminal carrying a signal indicative of the voltage difference between the first and second conducting leads, and,
   a processor connected to the output terminal of the voltage measuring element for processing the first voltage difference and the second voltage difference to obtain the RTD voltage.

2. The apparatus of claim 1 wherein the switch is a relay switch.

3. The apparatus of claim 1 wherein the switch is a solid-state switch.

4. The apparatus of claim 1 wherein the switch controller is a microprocessor.

5. The apparatus of claim 1 wherein the voltage measuring element comprises a differential amplifier having a first input connected to the first conducting lead and a second input connected to the second conducting lead.

6. The apparatus of claim 5 further comprising an A/D converter connected to an output of the differential amplifier.

7. The apparatus of claim 1 wherein the processor comprises means for summing the first voltage difference and the second voltage difference.

8. A method for measuring a temperature of a substance in thermal communication with an RTD, the RTD having first and second terminals for measuring an RTD voltage and having first and second conducting leads extending from the first and second terminals, the first and second conducting leads having substantially equal lead resistances, the method comprising during a first measurement interval,
directing a known current through the first conducting lead and diverting the known current from the second conducting lead, and
measuring a first voltage difference between the first and second leads, during a second measurement interval,
directing the known current through the second conducting lead and diverting the known current from the first conducting lead, and
measuring a second voltage difference between the first and second conducting leads, and, processing the first voltage difference and the second voltage difference to obtain the RTD voltage.

9. The method of claim 8 wherein directing the current through the first conducting lead during the first measurement interval comprises setting a switch to a first position in which the first lead is connected to a current source.

10. The method of claim 9 wherein directing the current through the second conducting lead during the second measurement interval comprises setting the switch to a second position in which the second lead is connected to the current source.

11. The method of claim 8 wherein measuring a first voltage difference between the first and second conducting leads comprises connecting the first lead to the first input of a differential amplifier, connecting the second conducting lead to a second input of the differential amplifier, and measuring a voltage at an output terminal of the differential amplifier.

12. The method of claim 8 wherein processing comprises summing the first voltage difference and the second voltage difference to obtain the RTD voltage.

13. A temperature measurement system comprising
an RTD having first and second terminals for measuring an RTD voltage between the first terminal and the second terminal,
a first lead connected to the first terminal and having a first lead resistance,
a second lead connected to the second terminal and having a second lead resistance substantially equal to the first lead resistance,
a switch having,
a first position for directing current to the RTD through the first lead and diverting current from the second lead, and
a second position for directing current through the second lead and diverting current from the first lead,
a switch controller coupled to the switch for selectively setting the switch to the first position during a first measurement interval and setting the switch to the second position during a second measurement interval,
voltage measurement means connected to the first and second leads for measuring, during the first measurement interval, a first voltage difference between the first lead and the second lead and for measuring, during the second measurement interval, a second voltage difference between the first lead and the second lead, and
a processor for processing the first voltage difference and the second voltage difference to obtain the RTD voltage.

14. A method for measuring the resistance of an RTD having a first terminal connected to a first lead and a second terminal connected to a second lead, the first and second leads having substantially equal lead resistances, the method comprising during a first measurement interval, directing a known current through the first lead and through the RTD, thereby generating a first signal indicative of a voltage drop resulting from the first lead and a voltage drop across the RTD, during a second measurement interval, directing the known current through the second lead and diverted from the RTD, thereby generating a second signal indicative of a voltage drop resulting from the second lead, combining the first signal, the second signal, and the known current to determine the resistance of the RTD.

15. The method of claim 14, wherein combining comprises adding the first and second signals and dividing by the known current.

16. A voltage-measuring circuit for interfacing with an RTD, said voltage-measuring circuit comprising
an electrical current source providing a known current,
first and second interface terminals adapted for connection with a first and second terminal of the RTD,
a switch having
a first position in which the first interface terminal is in electrical communication with the known current,
a second position in which the second interface terminal is in electrical communication with the known current,
a switch controller coupled to the switch for selectively setting the switch to the first position during a first measurement interval and
setting the switch to the second position during a second measurement interval,
a voltage measuring element having first and second input terminals adapted for connection with the first interface terminal and to the second interface terminal for evaluating, during the first measurement interval, a first voltage difference between the first input terminal and the second input terminal and for evaluating, during the second measurement interval, a second voltage difference between the first input terminal and the second input terminal, the voltage measuring element having an output terminal carrying a signal indicative of the voltage difference between the first and second input terminals, and
a processor connected to the output terminal of the voltage measuring element for processing the first voltage difference and the second voltage difference to obtain an output voltage representative of the RTD voltage.

17. An apparatus for interfacing with an RTD, the RTD having first and second RTD terminals for measuring an RTD voltage and first and second conducting leads extending from the first and second RTD terminals and having substantially equal lead resistances, the apparatus comprising,
an electrical source providing a known current,
a switch having
a first position adapted to provide electrical communication between the first conducting lead and the electrical source,
a second position adapted to provide electrical communication between the second conducting lead and the electrical source, a switch controller coupled to the switch for selectively setting the switch to the first position during a first measurement interval and setting the switch to the second position during a second measurement interval, a voltage measuring element having first and second input terminals adapted for connection to the first conducting lead and to the second conducting lead for evaluating, during the first measurement interval, a first voltage difference between the first input terminal and the second input terminal and for evaluating, during the second measurement interval, a second voltage difference between the first input terminal and the second input terminal, the voltage measuring element having an output terminal carrying a signal indicative of the voltage difference between the first input terminal and the second input terminal, and a processor connected to the output terminal of the voltage measuring element for processing the first voltage difference and the second voltage difference to obtain voltage responsive to an output of the RTD voltage.

* * * * *